(12) United States Patent
Boatwright

(10) Patent No.: US 8,200,190 B2
(45) Date of Patent: *Jun. 12, 2012

(54) CALL SECURITY SYSTEM

(75) Inventor: John T. Boatwright, Hopkinton, NH (US)

(73) Assignee: AC IP Software Institute LLC, Wilmington, DE (US)

(*) Notice: Subject to any disclaimer, the term of this patent is extended or adjusted under 35 U.S.C. 154(b) by 198 days.

This patent is subject to a terminal disclaimer.

(21) Appl. No.: 12/783,515

(22) Filed: May 19, 2010

(65) Prior Publication Data

US 2010/0310055 A1    Dec. 9, 2010

Related U.S. Application Data

(63) Continuation of application No. 10/160,357, filed on May 31, 2002, now Pat. No. 7,747,243, which is a continuation of application No. 09/712,701, filed on Nov. 13, 2000, now Pat. No. 6,505,039, which is a continuation of application No. 08/445,576, filed on May 22, 1995, now Pat. No. 6,185,415, which is a continuation of application No. 07/856,525, filed on Mar. 24, 1992, now abandoned.

(51) Int. Cl.
*H04M 1/66* (2006.01)

(52) U.S. Cl. ........................................ 455/410; 455/405

(58) Field of Classification Search .................. 455/405, 455/406, 407, 408, 410, 411, 67.11, 67.7; 379/32.01, 33, 38.02, 91.01, 91.02, 111, 379/112.01, 112.04, 114.01, 114.14, 115.01, 379/115.02, 121.01, 126, 127.02, 128, 133, 379/145, 188, 189, 191, 192, 200; 704/272
See application file for complete search history.

(56) References Cited

U.S. PATENT DOCUMENTS 4,071,698 A    1/1978  Barger
(Continued)

FOREIGN PATENT DOCUMENTS

JP    4-20055    1/1992

OTHER PUBLICATIONS

Myskja, "A Recording and Processing System for Accounting and Traffic Analysis on a Large PABX", IEEE Transaction on Communication Technology. 1971.

(Continued)

*Primary Examiner* — Quochien B Vuong
(74) *Attorney, Agent, or Firm* — Stolowitz Ford Cowger LLP

(57) ABSTRACT

A method and apparatus for reducing the vulnerability of the telecommunications system to unauthorized use that is easy to implement and that can reduce the instances of unauthorized access even during periods when telecommunications personnel are not able to give attention to the traffic on the system. The telecommunications system collects statistics of each user's pattern of telecommunications usage. Typically, these statistics will be in the form of, say, the average number of calls per day or the average number of calls per day on given days of the week. It may also include the mean busy hour for the given days of the week. Moreover, daily averages may be taken not only for all calls but also for all calls of a particular type, e.g., of all international calls. These statistics are taken for a reference period, such as the preceding thirty days, and the corresponding quantity for the current day is also computed. If the current statistics are not excessive as compared with the reference statistics, then access to a communications resource—e.g., an outgoing trunk line—is granted to the call without any supplemental access restrictions. But if a predetermined deviation is detected between the current statistics and the reference statistics, then a supplemental restriction is placed upon the call.

21 Claims, 7 Drawing Sheets

U.S. PATENT DOCUMENTS

| | | |
|---|---|---|
| 4,182,934 A | 1/1980 | Keys |
| 4,463,348 A | 7/1984 | Sidebottom |
| 4,481,384 A | 11/1984 | Matthews |
| 4,534,056 A | 8/1985 | Feilchenfeld |
| 4,792,968 A | 12/1988 | Katz |
| 4,799,255 A | 1/1989 | Billinger et al. |
| 4,827,744 A | 5/1989 | Namazue et al. |
| 4,829,554 A | 5/1989 | Barnes |
| 4,876,717 A | 10/1989 | Barron et al. |
| 4,893,330 A | 1/1990 | Franco |
| 4,893,335 A | 1/1990 | Fuller et al. |
| 4,896,346 A | 1/1990 | Belfield et al. |
| 4,908,850 A | 3/1990 | Masson et al. |
| 4,935,956 A | 6/1990 | Hellwarth et al. |
| 4,953,198 A | 8/1990 | Daly et al. |
| 4,955,049 A | 9/1990 | Ghisler |
| 4,958,368 A | 9/1990 | Parker |
| 5,018,190 A | 5/1991 | Walker et al. |
| 5,091,942 A | 2/1992 | Dent |
| 5,109,408 A | 4/1992 | Greenspan et al. |
| 5,125,022 A | 6/1992 | Hunt et al. |
| 5,127,043 A | 6/1992 | Hunt et al. |
| 5,144,649 A | 9/1992 | Zicker et al. |
| 5,163,086 A | 11/1992 | Ahearn et al. |
| 5,168,517 A | 12/1992 | Waldman |
| 5,220,593 A | 6/1993 | Zicker |
| 5,237,612 A | 8/1993 | Raith |
| 5,309,501 A | 5/1994 | Kozik |
| 5,335,265 A | 8/1994 | Cooper |
| 5,335,278 A | 8/1994 | Matchett |
| 5,345,595 A | 9/1994 | Johnson et al. |
| 5,351,290 A | 9/1994 | Naeini et al. |
| 5,375,244 A | 12/1994 | McNair |
| 5,392,335 A | 2/1995 | Reeder |
| 5,392,357 A | 2/1995 | Bulfer |
| 5,504,810 A | 4/1996 | McNair |
| 5,514,862 A | 5/1996 | Salzano |
| 5,517,555 A | 5/1996 | Amadon |
| 5,517,567 A | 5/1996 | Epstein |
| 5,539,816 A | 7/1996 | Pinard |
| 5,544,225 A | 8/1996 | Kennedy |
| 5,566,234 A | 10/1996 | Reed |
| 5,596,632 A | 1/1997 | Curtis |
| 5,598,459 A | 1/1997 | Haartgen |
| 5,602,906 A | 2/1997 | Phelps |
| 5,615,253 A | 3/1997 | Kocan |
| 5,615,408 A | 3/1997 | Johnson |
| 5,617,470 A | 4/1997 | Depasquale |
| 5,623,539 A | 4/1997 | Bassenyemukasa |
| 5,627,886 A | 5/1997 | Bowman |
| 5,655,004 A | 8/1997 | Holbrook |
| 5,673,309 A | 9/1997 | Woynoski |
| 5,719,926 A | 2/1998 | Hill |
| 5,757,896 A | 5/1998 | Akhteruzzaman |
| 5,758,277 A | 5/1998 | Hawkes |
| 5,771,455 A | 6/1998 | Kennedy |
| 5,805,686 A | 9/1998 | Moller |
| 5,809,125 A | 9/1998 | Gammino |
| 5,812,650 A | 9/1998 | Gammino |
| 5,812,955 A | 9/1998 | Dent |
| 5,826,195 A | 10/1998 | Westerlage |
| 5,839,063 A | 11/1998 | Lee |
| 5,852,811 A | 12/1998 | Atkins |
| 5,905,949 A | 5/1999 | Hawkes |
| 5,924,025 A | 7/1999 | Kaplan |
| 5,940,751 A | 8/1999 | Kaplan |
| 5,953,398 A | 9/1999 | Hill |
| 5,956,634 A | 9/1999 | Otterson |
| 5,956,635 A | 9/1999 | Hoogerwerf |
| 5,966,650 A | 10/1999 | Hobson |
| 5,970,129 A | 10/1999 | Asfar |
| 5,991,617 A | 11/1999 | Powell |
| 6,026,293 A | 2/2000 | Osborn |
| 6,038,555 A | 3/2000 | Field |
| 6,058,301 A | 5/2000 | Daniels |
| 6,064,972 A | 5/2000 | Jankowitz |
| 6,067,535 A | 5/2000 | Hobson |
| 6,072,863 A | 6/2000 | Potter |
| 6,078,807 A | 6/2000 | Dunn |
| 6,094,573 A | 7/2000 | Heinonen |
| 6,104,795 A | 8/2000 | Akhteruzzaman |
| 6,104,803 A | 8/2000 | Weser |
| 6,141,404 A | 10/2000 | Westerlage |
| 6,185,415 B1 | 2/2001 | Boatwright |
| 6,185,416 B1 | 2/2001 | Rudokas |
| 6,188,753 B1 | 2/2001 | Asfar |
| 6,330,546 B1 | 12/2001 | Gopinathan |
| 6,505,039 B1 | 1/2003 | Boatwright |
| 6,526,389 B1 | 2/2003 | Murad |
| 6,947,532 B1 | 9/2005 | Marchand et al. |

OTHER PUBLICATIONS

Cottrell, "Analysis of Network Statistics", Conference in High Energy Physics. 1987.

Daly, "Application Monitors Telecom Systems for Fraud", Computer World. 1992.

Hennen et al., "Land Mobile Voice Privacy Communications", 30th IEEE Vehicular Conference. 1980.

Treves "Maintenance Strategies for PCM Circuit Switching", Proceedings of the IEEE. 1977.

Blankenhorn, "New for Telecom—Moscom fights PBX fraud—VoiceLock Prevents Hacker Access to PBX systems—Product Announcement", NewsBytes News Network. 1991.

Cook, "New Game in Town—There's No Such Thing as a Fee Phone Call". IEEE. 1990.

Rohrbough, "New Product Helps Detect Toll-Fraud—Toll Fraud Monitoring Service form Account-A-Call Corp". NewsBytes News Network. 1991.

"Guard Your PBX—Security of Telephone Systems," Communications News. 1990.

"Virtual Networks: Past, Present and Future," Brosemer et al., IEEE Communications Magazine, Mar. 1992 pp. 80-85.

Harler, Curt, "How to Prevent Wily Hackers From Plundering Your Phones," Communications News, Jan. 1992.

Stolowitz Ford Cowger LLP, Listing of Related Cases, Jul. 7, 2010.

Subscriber Computing Inc. news release entitled "Subscriber Computing, Inc. Unveils Advanced Version of FraudWatch.TM.", Mar. 1, 1993, Irvine, Calif., 3 pages, no auther given.

EDS Personal Communications Corp. News Release, "EDS Personal Communications Corporation Announces Comprehensive Fraud Solutions and Capabilities", Mar. 2, 1993, Waltham, Mass., 3 pages, no author given.

EDS Personal Communications Corp., News Release entitled, "EDS Personal Communications Corporation Tackles Fraud with New 'Strategic Partnership' Plan." Waltham, Mass., 4 pages, no author or date of publication given.

"Telemate Fraud Software Ready", Jul. 13, 1992. Communications Week p. 24.

"Hacon System Self-Activates Computer Fraud & Security Bulletin", Nov. 1992, Elsevier Advanced Technology Publications.

Lewyn, Mark: "Phone Sleuths Are Cutting Off The Hackers . . . ", Jul. 13, 1992, Business Week.

An article with the byline Jennifer Lieffers from Lexis-Nexis vol. 3; No. 21; sec 1; p. 26 Mar. 16, 1987.

Telemate Fraud Software Reads Jul. 13, 1992 from Lexis-Nexis.

CALL SECURITY SYSTEM

RELATED APPLICATION

The present is a continuation of application Ser. No. 10/160,357 filed May 31, 2002 (now issued as U.S. Pat. No. 7,747,243), which is a continuation of application Ser. No. 09/712,701 filed Nov. 13, 2000 (now issued as U.S. Pat. No. 6,505,039) which is a continuation of application Ser. No. 08/445,576 filed May 22, 1995 entitled "Call Security System" (now issued as U.S. Pat. No. 6,185,415), which is a continuation of application Ser. No. 07/856,525 filed Mar. 24, 1992, now abandoned. Priority of the above applications is claimed.

BACKGROUND OF THE INVENTION

The present invention is directed to call-switching equipment for telephone networks and in particular to devices for curbing abuse of direct-inward-access systems.

The combination of electronic, stored-program telephone switching systems with discounted bulk toll offerings gives rise to a feature that provides a convenient way to reduce telecommunications costs. In accordance with this feature, an authorized person at a remote location can place a call to a "home office" private branch exchange (PBX), receive dial tone from the PBX, and place an outgoing call just as if he were calling from his office.

The industry uses the acronyms RSA (Remote Service Access) and DISA (Direct Inward Service Access) interchangeably to refer to this feature, to which we refer herein as DISA. DISA features are currently available primarily in conjunction with PBX systems, and we will accordingly refer to PBX systems for the purpose of concreteness. However, DISA-like features are also available to users of certain central-office-based services, and it will become apparent that the invention to be described below is applicable to these types of arrangements, too, as well as to a host of non-voice-based services, including but not limited to data networks and modem pools. The invention is equally powerful in providing protection of sensitive internal destinations, such as the maintenance ports of communications and computer systems.

DISA offers both cost and administrative advantages. If the firm that owns the PBX subscribes to bulk-rate toll services, such as WATS, placing a call through remote service access can reduce the cost of the call. For example, an employee whose home office is in Seattle but who has traveled to San Diego may want to call a customer in Fort Lauderdale. If he uses his telephone-company calling card, a ten-minute call at AT&T daytime rates may cost around $3.00. In contrast, his company may pay around $0.09 a minute on the average for both incoming and outgoing bulk services, so if the employee places the call instead to his Seattle office, which then switches it to the customer in Fort Lauderdale, the cost may be only about $1.80.

Moreover, the company's call-accounting system can thereby keep track of such calls automatically, relieving the company's accounting department of the need to allocate telephone costs manually among its various departments. In certain circumstances, it also provides a tool for measuring the performance of personnel whose jobs involve high levels of telephone activity.

Unfortunately, unscrupulous people can sometimes discover the passwords by which the DISA systems' owners attempt to restrict access to their facilities. Indeed, such occurrences have happened frequently, some of them resulting in large losses to the company that has availed itself of the DISA feature. In like manner, loss and system damage have resulted from fraudulent abuse of voice mail and messaging systems, to which the application of the invention is equally applicable.

Responses to this problem have been various. Some users have simply discontinued the DISA feature because of the risk of significant loss. Others have reconfigured to disable its use for calls to destination area codes known to be favorites of "hackers," and they may also monitor telephone traffic so as to identify unusual activity.

Of course, discontinuing the DISA service does eliminate the problem, but it also eliminates the savings that ordinarily result from DISA-service use. The other approaches can be fairly effective in general, but they lack flexibility, require excessive attention from the telecommunications manager, or both.

SUMMARY OF THE INVENTION

The present invention is a method and apparatus for reducing the vulnerability of the telecommunications system to unauthorized use that is easy to implement and that can reduce the instances of unauthorized access even during periods when telecommunications personnel are not able to give attention to the traffic on the system.

In accordance with the invention, the telecommunications system collects statistics of each user's pattern of telecommunications usage. Typically, these statistics will be in the form of, say, the average number of calls per day or the average number of calls per day on given days of the week It may also include the mean busy hour for the given days of the week. Moreover, daily averages may be taken not only for all calls but also for all calls of a particular type, e.g., of all international calls.

These statistics are taken for a reference period, such as the preceding thirty days, and the corresponding quantity for the current day is also computed. If the current statistics are not excessive as compared with the reference statistics, then access to a communications resource—e.g., an outgoing trunk line—is granted to the call without any supplemental access restrictions. But if a predetermined deviation is detected between the current statistics and the reference statistics, then a supplemental restriction is placed upon the call.

For instance, the caller might be required to say his name before the connection is made, he might be transferred to a human operator for verification of access, or the requested connection may simply be denied. Additionally, the system would typically give the system administrator some kind of an alerting message to indicate that abnormal usage is occurring.

With this type of system, the restrictions are imposed, in some sense, in "real time"; there is ordinarily no need for a human administrator to take initiative to impose the restrictions or even to analyze records for unusual activity.

In accordance with one aspect of the invention, moreover, the invention can be practiced in a way that makes it very easy for the administrator to implement. Specifically, apparatus for practicing the invention can be provided in the form of circuitry that is simply connected to one of the communications system's ordinary lines. In the case of a PBX, that line would be one of the PBX's internal extensions. The PBX is then simply configured so that it connects the DISA trunk line or lines to that extension whenever an incoming call comes over that DISA line. The access-control circuit at that extension takes the call, checks for the user's identifier and password, requests the number of the called party, and, if the above-mentioned statistical requirements are met, simply sends the conventional transfer signal, e.g., a hook flash, to the PBX to obtain (typically) an outgoing trunk and delivers to the PBX the destination indicated by the incoming call. The PBX then makes the necessary connections in the conventional manner, and the access-control circuit is free to handle the next DISA call.

Clearly, such an arrangement is simple to implement, since it requires only that the access-control circuit be connected to an extension and that the PBX undergo the minor reconfiguration required to direct DISA calls to that extension.

BRIEF DESCRIPTION OF THE DRAWINGS

These and further features and advantages of the present invention are described in connection with the accompanying drawings, in which.

DETAILED DESCRIPTION OF AN ILLUSTRATIVE EMBODIMENT

Figure 1:
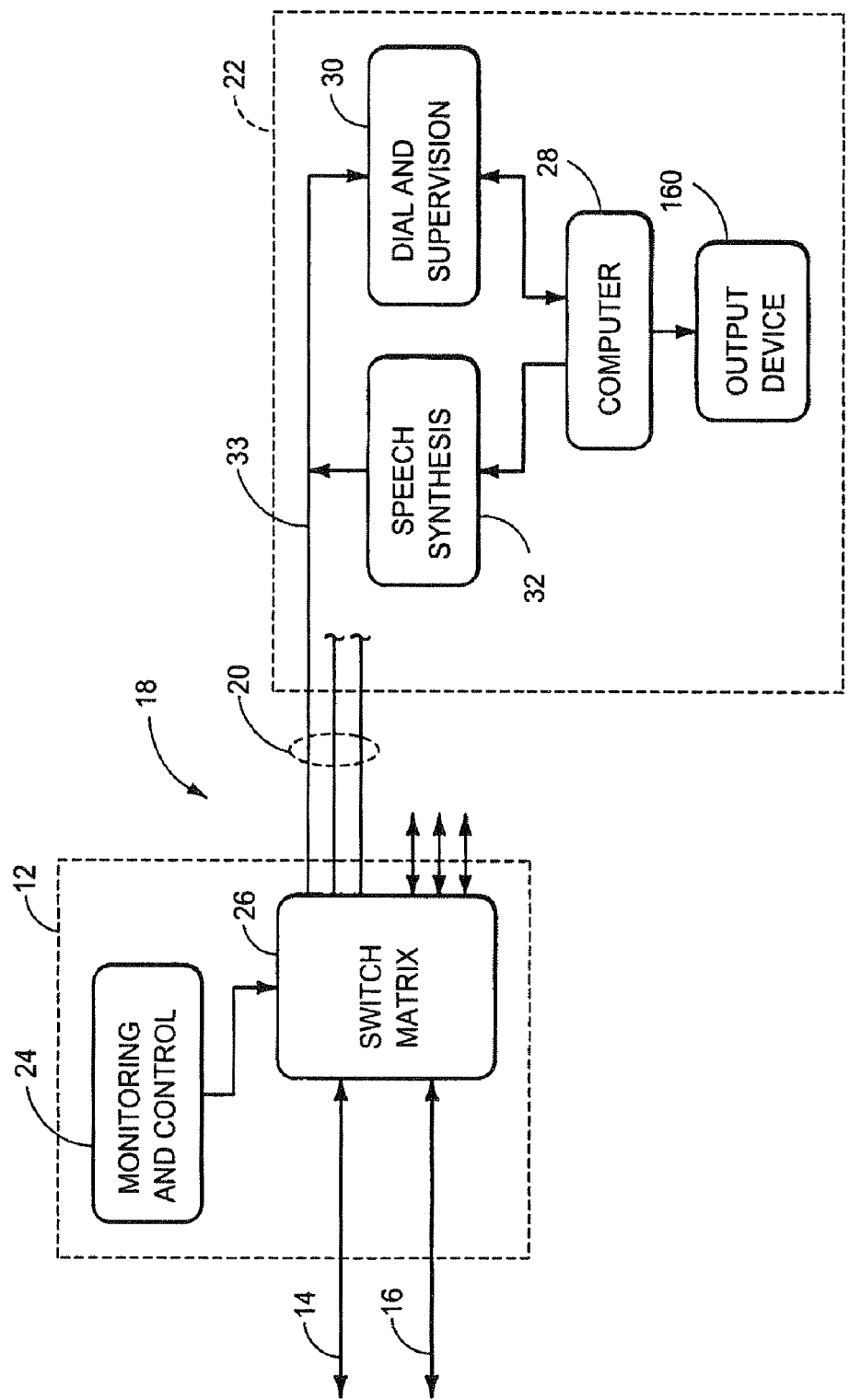
FIG. 1 is a block diagram of a communications system that implements the teachings of the present invention.

FIG. 1 depicts a telecommunications system 10 that includes a conventional private branch exchange (PBX) 12 to which the owner's trunks 14 and 16 devoted to remote access, and possibly some other trunks not shown, are connected. Also connected to the PBX 12 are internal extension lines 18, including particularly at least one access-control extension line 20, to which an access-control circuit 22 of the present invention has been connected.

The PBX 12 has the conventional monitoring and control circuitry 24 by which it monitors the lines for dial and supervisory signals and operates a switch matrix 26 that makes the connections between lines that are the PBX's ultimate purpose.

We assume that trunk 14 is one employed for DISA service. In conventional operation, the user will have dialed his company's number for such service, typically a WATS number (i.e., an "800" number in North America), and will thereby have been connected to the PBX 12. The monitoring-and-supervisory-signal circuitry 24 will then apply a stutter dial tone to the DISA trunk 14, in response to which the user will enter the authorization code that he has been assigned for use in obtaining an outgoing trunk. After verifying that the code is correct, circuit 24 operates the switch matrix to connect the incoming trunk 14 with another, outgoing trunk, say, trunk 16, whereupon the originating user hears dial tone received over trunk 16 and is thereby prompted to dial the ultimate-destination number.

For use with the present invention, however, the PBX 12 is configured so that the switch matrix 26 initially connects all incoming calls from WATS trunk 14 to one of the extension lines 20 to which the access-control circuit 22 is connected. That is, to implement the present invention, the telephone administrator will have been required essentially only to obtain an access-control module 22 from the manufacturer, plug it into one or more extension jacks, and configure the PBX 12 in an arrangement conventionally referred to as DIT (Direct Inward Termination), for connection of all trunk-14 calls to a free one of the access-control extensions 20.

The access-control module 22 can be implemented in many ways, a typical one being shown in FIG. 1, which depicts it as including a computer 28. For line 33, it also includes a dial-signal circuit 30 and, in this case, a voice synthesizer 32. It includes similar circuits for the other access-control lines 20. The dial-signal circuit 30 can generate and recognize dial and supervisory signals, and it can also sample a short record of, say, received voice signals for purposes that will be explained below. The speech synthesizer can generate voice prompts. (Those skilled in the art will readily recognize that the voice prompts that will be described below are not necessary in order to practice the present invention, but we believe that such an approach is desirable.)

Briefly, the computer 28 receives notification from the dial-signal circuit 30 that an incoming call is present on, say, line 33, and it accordingly returns the off-hook signal and operates the speech synthesizer 32 for that line to generate a voice prompt that asks the user for his authorization code in the form of a user ID and a password. (User IDs and passwords do not have to be assigned separately, but it is often appropriate to do so; regular changing of passwords is desirable for security purposes, but a fixed user ID is desirable for continuity in recordkeeping.) If the user enters the proper authorization code, the computer then operates the speech synthesizer 32 to request the called number.

When the user has entered that number, the computer verifies it as a destination to which the user is entitled to have his call directed. If the user is indeed so authorized, the computer simply operates the dial-signal circuitry 30 to generate a hook flash or other transfer-indicating signal and then transmit the digits of the destination that the access-control module 22 received from the user in response to the destination prompt. This will cause the PBX 12 to respond in the conventional fashion by connecting the incoming trunk 14 to the appropriate communications resource, which either is one of the internal extension lines 18 or an external trunk 16, and thereby disconnecting it from the access-control module 22. Then, if other calls come in on other DISA-designated trunks (not shown), the PBX 12 can route them to the access-control module 22 by way of line 33 even though the. call initially received over that line is still in progress.

Of course, an incoming call can arrive while the call-control module 22 is still in the process of directing calls received on all of the access-control lines 20, and the result will be that the PBX will return a busy signal in the conventional manner so that the prospective user will be required to call again if he is to make the connection through the company's PBX and thereby avail himself of the lower, WATS-line rates. Alternately, if the PBX is so equipped, the call may be held briefly in an automatic-call-distribution arrangement to be connected to the call-control module when a line becomes free. Further, if the PBX is so equipped, the call may be transferred upon encountering a busy or no-answer condition to an alternate destination, such as the console attendant.

As is stated above, the access-control module 22 makes the necessary transfer only if the user is entitled to access to the indicated destination. Entitlement here is determined by three factors. First, certain destinations, typically highly sensitive ones such as those employed to program the PBX 12 or the access-control module 22, can be reached by only one or very few users, as will be described below. Accordingly, these are not among the locations to which access is ordinarily granted.

Secondly, the system administrator, by programming the access-control module, can assign each user a service class. In the illustrated embodiment, there are ten of these. If a user has been assigned only service class 0, then he is allowed access only to the PBX's local extensions, except, of course, those particularly identified as highly sensitive. If a user has been assigned service class 1, 2, 3, or 7, he is ordinarily accorded access to DISA service; that is, by calling in on a WATS line, he can be granted access to an outgoing facility. (The differences among classes 1, 2, 3, and 7 will be described below.) Classes 4, 5, and 6 provide for access to fixed destinations, such as modem-pool ports, not under the control of the caller.

Service classes 8 and 9 are special classes for particular users who require access to sensitive destinations other than the programming functions of the access-control module. In these service classes, the user is not granted immediate access to any location. Instead, the user is asked to hang up, and the access-control module 22 places a call to a predetermined location where that user is supposed to be. This adds an additional level of confidence that the user is who he says he is. If the user's service class is 8, the access-control module 22 transfers that call to another predetermined location; that is, a user assigned to service class 8 is permitted to make a call only between two locations that have been determined in advance by previous programming.

A user assigned service class 9 receives a callback in a manner the same as that in which users assigned service class 8 are. However, rather than being transferred to a second location, the service-class-9 user is granted access to the programming functions of the access-control module. Typically, the callback location programmed for service class 9 is the office of the system administrator, so reprogramming of the access-control module ordinarily can be performed only from that location.

The third constraint on access to requested destinations is that imposed by the "global class of service," which the system administrator can change from time to time by programming in the normal manner. If the system administrator institutes global class 0, then incoming remote-service-access calls are granted access only to local extensions, regardless of the individual service class for the calling user. Global class 1 does not impose such a restriction, and users assigned individual service class 1, 2, 3, or 7 are granted access to outgoing facilities when global class 1 prevails.

Global class 2 is instituted when the system administrator wants to take advantage of the call-pattern-monitoring aspects of the present invention. Under global class 2, users assigned service class 7 are granted access to outgoing facilities just as they are under global class 1. Ordinarily users assigned to service class 1, 2, or 3 are also granted access to outgoing facilities under global class 2, with the exception that access to those outgoing lines is subject to certain restrictions when the access-control module 22 has detected certain traffic anomalies, which will now be described.

In general, the access-control module 22 maintains statistics on each user's communications traffic. In the illustrated embodiment, for example, the access-control module logs the number of calls by type (regular, long-distance, or international, for instance) and day of the week and keeps statistics of that user's usage. In the illustrated embodiment, for instance, the call-control module maintains the average over the previous thirty days by day of the week, typically omitting from that computation any day on which the user made no calls.

When a user attempts to make a DISA call, the total number of such calls made by that user for that day is compared with the mean number of calls for that day of the week.

This is the point at which the differences among service classes 1, 2, and 3 come into play. When a user code is initially activated, no history yet exists for it. To "prime" the system, therefore, the system automatically assigns a mean number of calls, and this number is determined by the service class. The means for classes 1, 2, and 3 might respectively be six, twelve, and eighteen calls, for instance.

If the number of calls for the current day does not exceed the mean number of calls for the current day of the week, then access is accorded as it is under global service class 1. If it does exceed that mean value, on the other hand, the action taken in response to the request to place the DISA call depends on how unusual the current activity for that user is.

To make this assessment, the access-control module computes a value F/T, where F is a factor, to be described below, associated with the user and T=1+aR, where R is a fraction between zero and 9.99 that the system administrator enters to indicate how sensitive the system is to be to variation in users' calling patterns, and a is 2.0 if the reference period for which statistics have been taken is less than fourteen days (as it will be when a new user has been added) and otherwise is 1.0 on weekdays and 0.5 on weekends.

The factor F is given by $F=f_1 f_2 f_3$, where $f_1$ is the ratio of the total calls for the current day to the mean number of calls for this day of the week.

Factor $f_2$ in this equation is given by $f_2=I+|\Delta B|/12$ where $\Delta B$ is given as follows:

$$\Delta B = \begin{matrix} |B_m - B_a| \text{ if } |B_m - B_c| \square 12 \\ 24 - |B_m - B_a| \text{ otherwise,} \end{matrix} \text{ otherwise,}$$

and $B_m$ is the mean busy hour for the current day of the week, $B_c$ is the mean busy hour for the current day, and the busy hours are given in accordance with a 24-hour clock.

The mean busy hour, of course, is computed by multiplying the number of each clock hour by the number of calls in that hour and dividing the sum of the results by the total number of calls.

Factor $f_3$ is given by $$f_3 I+[|P_1-P_1'|+|P_2-P_2'|+|P_3-P_3'|+|P_4-P_4'|]/2$$

where $p_1$, $p_2$, $p_3$, and $p_4$ are the ratios of current internal, same-area-code, different-area-code, and different-country calls, respectively, to the total number of calls and $p_1'$, $p_2'$, $p_3'$, and $p_4'$ are the corresponding historical values.

If this value F/T is less than 2, then access is accorded as it is under global service class 1. If F/T exceeds 2 but is less than 3, then the individual user's service class is temporarily switched from its normal value to −1. A user whose class is −1 is not immediately switched to the outgoing line when he requests it. Instead, he is given a verbal prompt that requests that he speak his name. If he does this, he will be accorded the access that he requests.

To verify that the user gives the right name requires speech-analysis programming, of course, so it may be considered preferable in some embodiments to dispense with this feature, since it may make the circuitry more elaborate than is considered worthwhile. As a practical matter, however, requesting that the user give his name and then merely testing to see whether voice signals result can itself prevent many unauthorized accesses; a "hacker" is often loath to leave a record of his voice.

An intermediate approach is to use a verification criterion that does not require the costly equipment and complex algorithms ordinarily associated with speech processing. For example, the dial-and-supervision circuit 30 may be used to detect, say, the onset of voice whose amplitude exceeds a certain threshold as well as the interruption of voice for more than a predetermined maximum time. The time interval between these two events, which would be assumed to contain the user's voice response, would be measured, and samples would be taken of the voice signal during that interval. Normalized versions of the resultant values might then be compared point-by-point with a similarly obtained reference record for the user, and a factor f.sub.4 might be computed in accordance with:

$$f_4 = 1 + k[(d-d')/d']^2 \sum_n (x_n - x'_n)^2,$$

where k is a normalizing constant whose value depends on the number of samples used, d is the duration of the answer, $x_n$ is the nth sample of the received voice response, and the primed values are the corresponding quantities taken from the reference voice record. This factor then could be used in a modified criterion quantity $F'=f_1 f_2 f_3 f_4$ and the user can be treated as having responded properly if the value of F'/T does not exceed 3.

In the illustrated embodiment, if the quantity F/T or F'/T exceeds 3, then the individual-service class is temporarily changed to −2, and the user is not permitted access to outbound trunks. Additionally, the access-control module can include a feature by which it responds to a call from a user whose code is −2 by placing a call to the extension of the system administrator and delivering a message that such a call has occurred. The invention can thus be employed to alert the system administrator to unusual usage without requiring any significant initiative on the administrator's part.

Figure 2A:
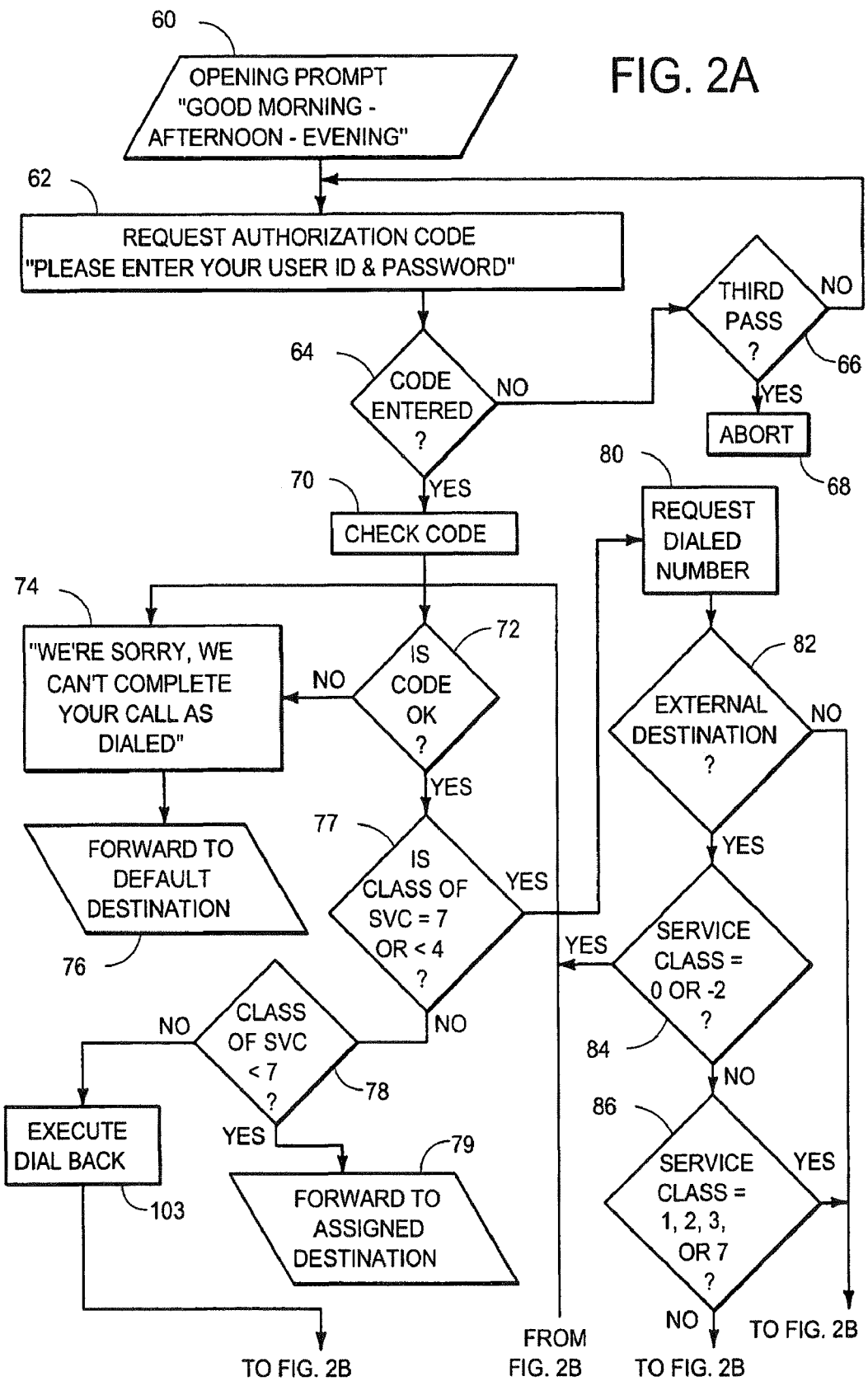
FIGS. 2A and 2B together form a flow chart that illustrates the call-processing sequence followed by a typical embodiment of the access-control circuit of FIG. 1.
Figure 2B:
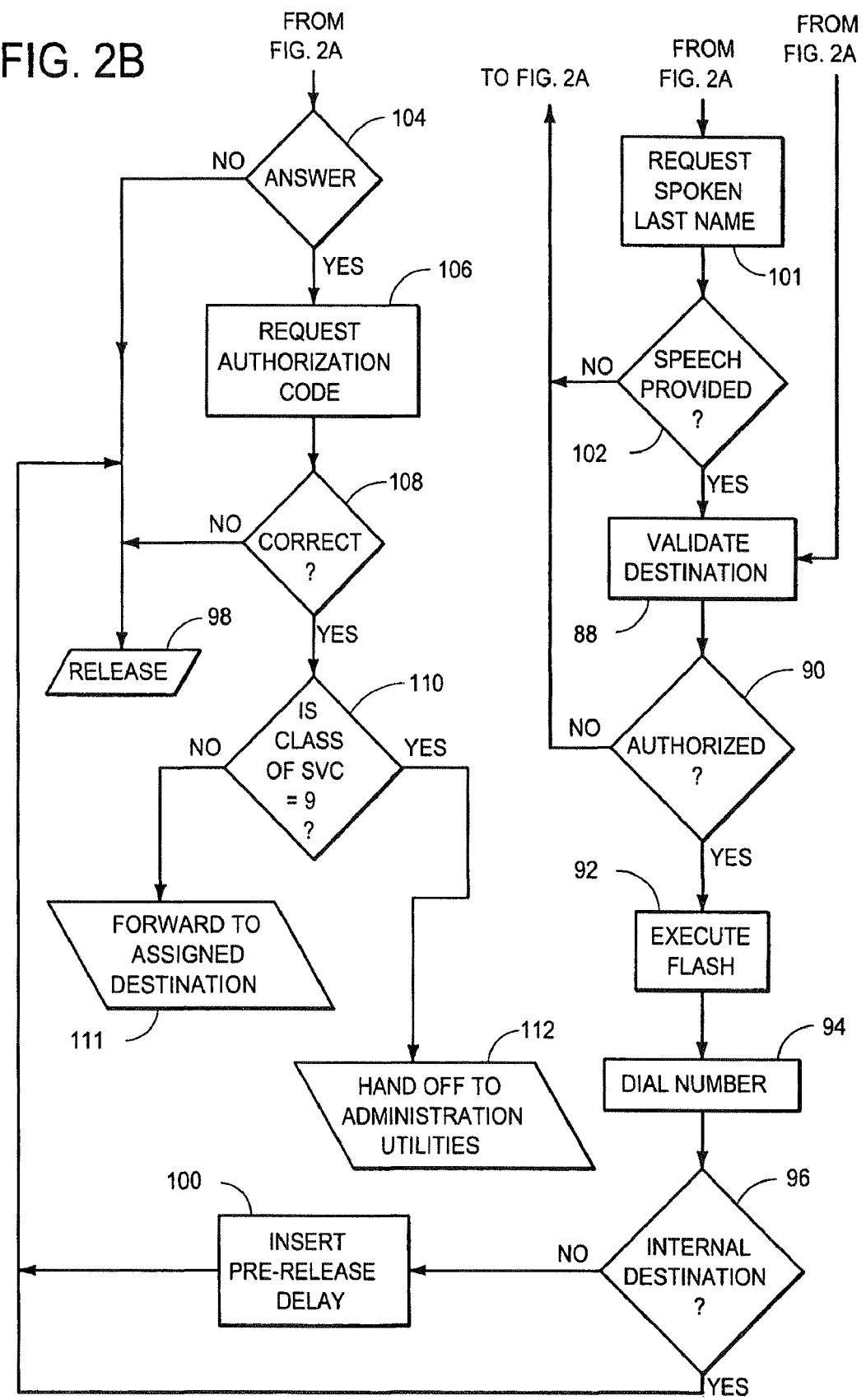

FIGS. 2A and 2B present in flow-chart form a typical procedure by which these features can be implemented. When the access-control module 22 receives a call, it sends a verbal greeting, as block 20 of the flow chart indicates, and then sends a verbal prompt requesting the user ID and password, as block 62 indicates. The user may not respond with an authorization code, as a negative result of test 64 represents, and block 66 represents branching on whether the prompt has been given three times. If not, it is repeated. After the third pass, however, the call is aborted, as block 68 indicates, simply by sending an on-hook signal, i.e., by hanging up.

Ordinarily, however, the user does enter a code, and the computer 28 checks the code, as block 70 indicates. Block 72 represents branching on the result of the checking process. If the code was incorrect, the user is ordinarily given a verbal message that indicates that the call cannot be completed, as block 74 indicates, and the access-control module 22 then ordinarily sends transfer signals to the PBX 12 to cause it to connect the call to a default destination, such as the extension of the local operator. Block 76 represents such a transfer.

If the user does enter a proper authorization code, on the other hand, the computer 28 determines whether the individual service class assigned to the user is 7 or less than 4 on the one hand or some other value on the other, as block 77 indicates. In the latter case, represented by a negative result of the block-77 decision, the service class is either one of the dialback classes 8 and 9 or one of the "deadbolt" classes 4, 5, and 6. The deadbolt classes yield a positive result of the block-78 decision and the call is directed, without any further user input, to the destination assigned the user, as block 79 indicates. That is, a user in class 4, 5, or 6 is afforded access to only one, predetermined destination. If the user is in class 8 or 9, on the other hand, he requires a dialback, as will be explained presently.

But first consider the result of a positive outcome of the block-77 decision. The computer 28 operates the speech synthesizer 32 to request that the user dial the number of his intended destination, as block 80 indicates. If the resultant dialed number designates an external destination, as an affirmative result of test 82 indicates, the computer 28 must determine whether it can fulfill the request. If the service class for the user is 0 or −2, then the result of a test represented by block 84 is affirmative, and the user is notified that the call cannot be completed, as block 74 indicates. Typically, he will then be connected to the system operator or other default destination, as block 76 indicates.

If the service class is 1, 2, 3, or 7, as an affirmative result of the test of block 86 indicates, the call can be completed, and the computer 28's routine proceeds to step 88, in which it validates the requested destination. That is, it determines whether the destination exists and if access to it is permitted. This step primarily concerns local extensions, but some embodiments of the invention may also place, say, certain area codes off limits.

If the destination does not exist or it is one to which general access is denied, a negative determination results from the test represented by block 90, and the routine proceeds to blocks 74 and 76, where the user is notified that the call cannot be completed. Otherwise, the access-control module 22 proceeds to transfer the call, typically by operating its dial-signal circuit 30 to execute a hook flash, as block 92 indicates, and then dialing the number received from the user, as block 94 indicates.

In order then to operate properly with most PBXs, it is necessary to branch again on whether the destination is internal or external, as block 96 indicates. If the destination is internal, then the access-control module 22 can operate the dial-signal circuit to go back on hook immediately, as block 98 indicates. For external calls, however, the transfer may not operate properly if the extension goes on hook immediately after the number is dialed. In those situations, therefore, the access-control module 22 performs a pre-release delay, represented by block 100, before proceeding to the release step 98.

A negative result of the test represented by block 86 means that the service class is −1, so the user is prompted to speak his last name, as block 101 indicates. As block 102 indicates, the user's failure to respond will cause the routine to proceed to steps 74 and 76, in which it notifies the user that the call will not be processed further. Otherwise, further processing proceeds in a manner similar to that in which it proceeds for calls from users in service classes 1, 2, 3, and 7.

If the class of service is 8 or 9, then the test represented by block 78 yields a negative result, and the routine proceeds to the step of block 103. That step is the dialback procedure, in which the computer 28 operates the speech synthesizer 32 to direct the user to hang up and operates the dial-signal circuit 30 to dial the dialback number associated with that user. If no answer results at that extension, the computer 28 operates the dial-signal circuit to go back on hook, as blocks 104 and 98 indicate. If the user does answer, the speech synthesizer 32 again requests the authorization code, as block 106 indicates, and an incorrect response again results in the line's being released, as blocks 108 and 98 indicate. If the service class is 8, the access-control module 22 sends transfer signals to the PBX 12 to cause it to connect the call to the destination extension previously programmed for that user, as blocks 110 and 112 indicate. Block 112 represents a series of steps similar to steps 92, 94, 96, and 98.

If the service class is 9, on the other hand, the user is admitted to the administration-utility functions of the access-control module 22, as block 112 indicates.

At this stage, the user is able to set the several parameters described above and perform other administrative functions.

Figure 3:
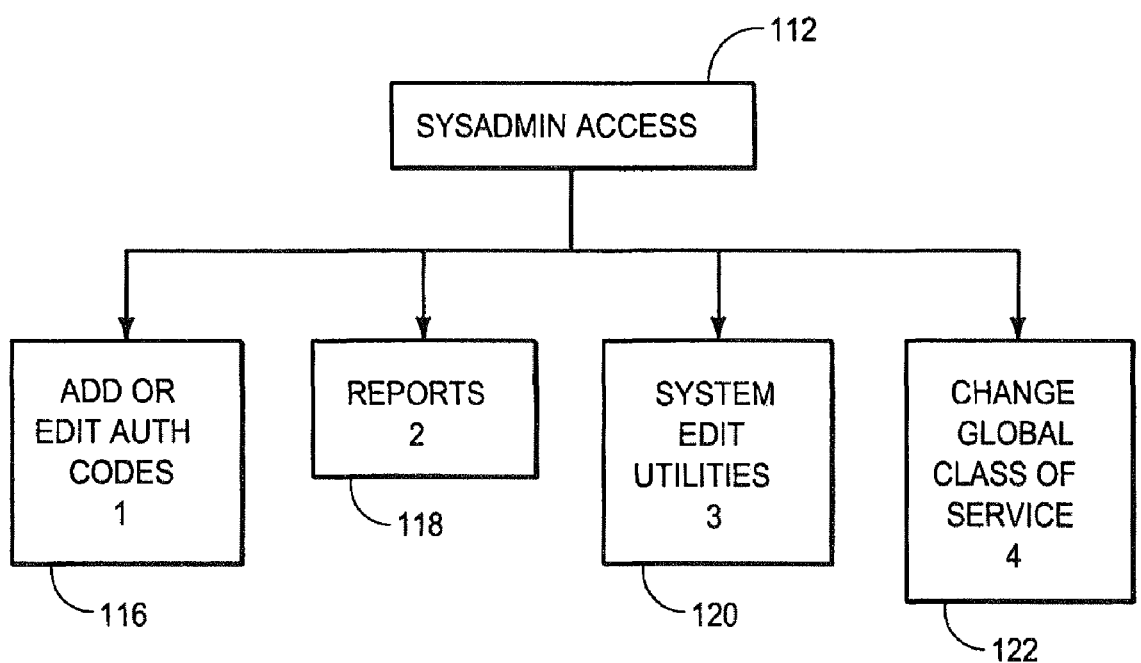
FIG. 3 is a flow chart that illustrates the manner in which a system administrator might program the access-control circuit.

Admitted to the administrative utilities, the user is first given a voice prompt to select one of four menu selections respectively represented by blocks 116, 118, 120, and 122 of FIG. 3: (1) adding or editing authorization codes, (2) requesting a report, (3) requesting the system edit utilities for purposes that will be shortly explained, and (4) changing the global service class. The user chooses from this menu by dialing the digit associated with each choice.

Figure 4:
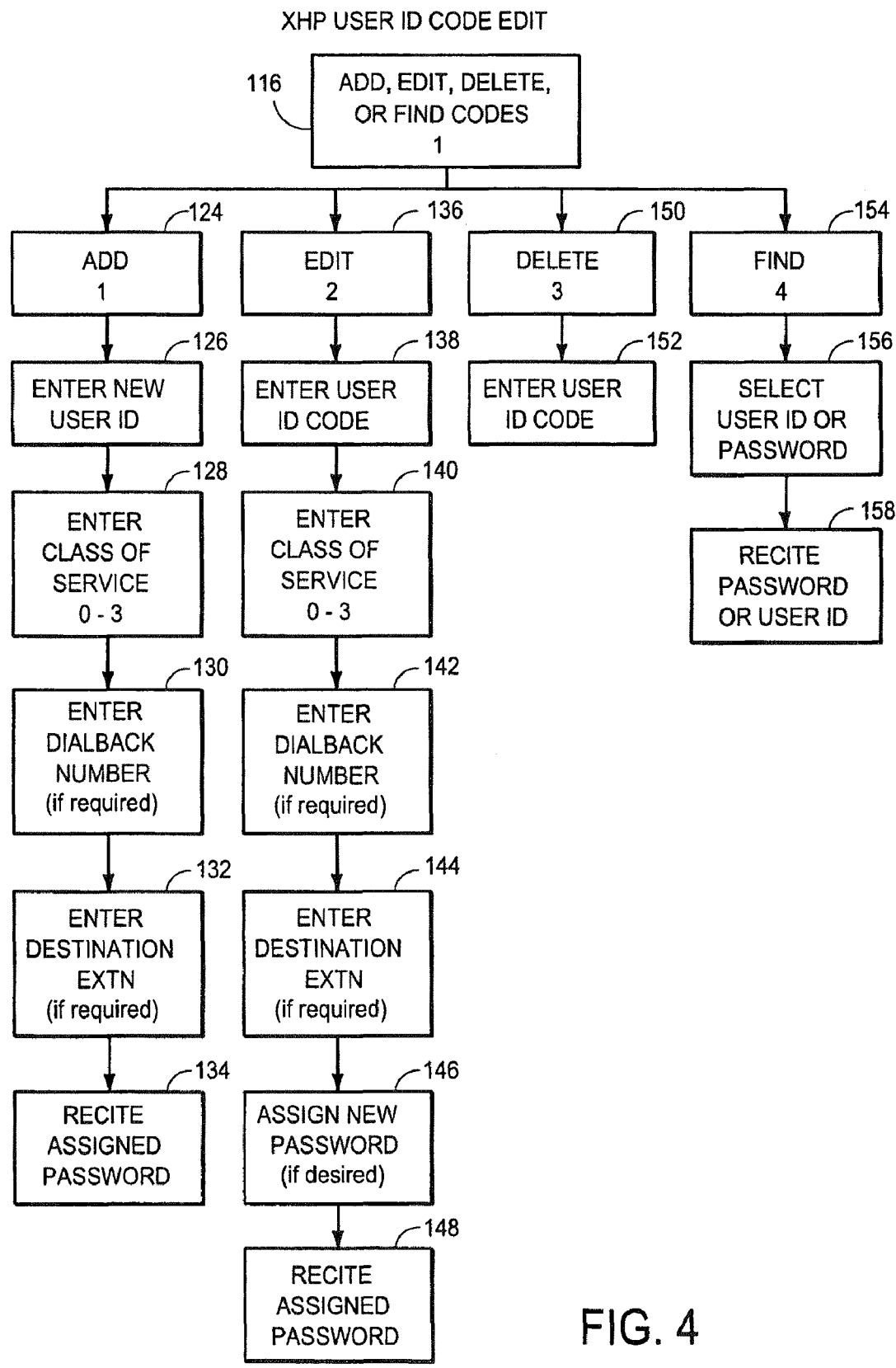
FIG. 4 is a flow chart that depicts the "add or edit auth. codes" step of FIG. 3 in 10 more detail.

Dialing a "1" admits the user to the choices depicted in FIG. 4. As FIG. 4 shows, the access-control module again requests that the user make a menu choice by dialing one of the digits "1" through "4" in order to add, edit, delete, or find, respectively, a user ID and/or password. If the administrator enters a "1," the speech synthesizer 32 gives him an automatically assigned new number and prompts him to enter a user number if he wishes to change what has been assigned. In a similar manner, a password will be assigned, and the administrator is given an opportunity to keep what was assigned or change it. Likewise a default service class is assigned and the administrator is given the opportunity to keep or change it. He is then prompted to enter the dialback number if the class of service is 8 or 9, and the destination extension if the service class is 8, as blocks 124, 126, 128, 130, and 132 indicate. The access-control module 22 then uses its speech synthesizer 32 to repeat the assigned password, as block 134 indicates.

At this point, the access-control module 22 prompts the administrator to make a further selection, but the administrator can simply hang up at this point if no further changes are to be made. Otherwise, he may, for instance, dial "2," which indicates that he wishes to edit the entries for an existing user. Block 136 represents this choice, in response to which the access-control module 22 prompts the administrator to enter the ID code of the user whose entries are to be changed, the new class of service for that user, the new dialback number if the service class is 8 or 9, the destination extension if the service class is 8, and the new password. Blocks 138, 140, 142, 144, and 146 represent these entries, which are followed by the access-control module 22's recitation of the new password, which block 148 represents.

If the administrator wants to delete a previously authorized user, he dials "3" and then dials the ID code of that user in response to a prompt, as blocks 150 and 152 indicate.

As blocks 154, 156, and 158 indicate, the system administrator also has the option of pressing the "4" key and thereby "looking up" the password assigned to a given user or the user assigned a given password.

The access-control module 22's computer 28 will typically be in the form of an off-the-shelf computer and thus will ordinarily include an output device 160. This may be a serial port for driving a printer. Alternatively, the floppy disk drive may be employed as an output device. In any event, most embodiments of the invention will include some output device other than just the speech synthesizer 32 for generating reports.

Figure 5:
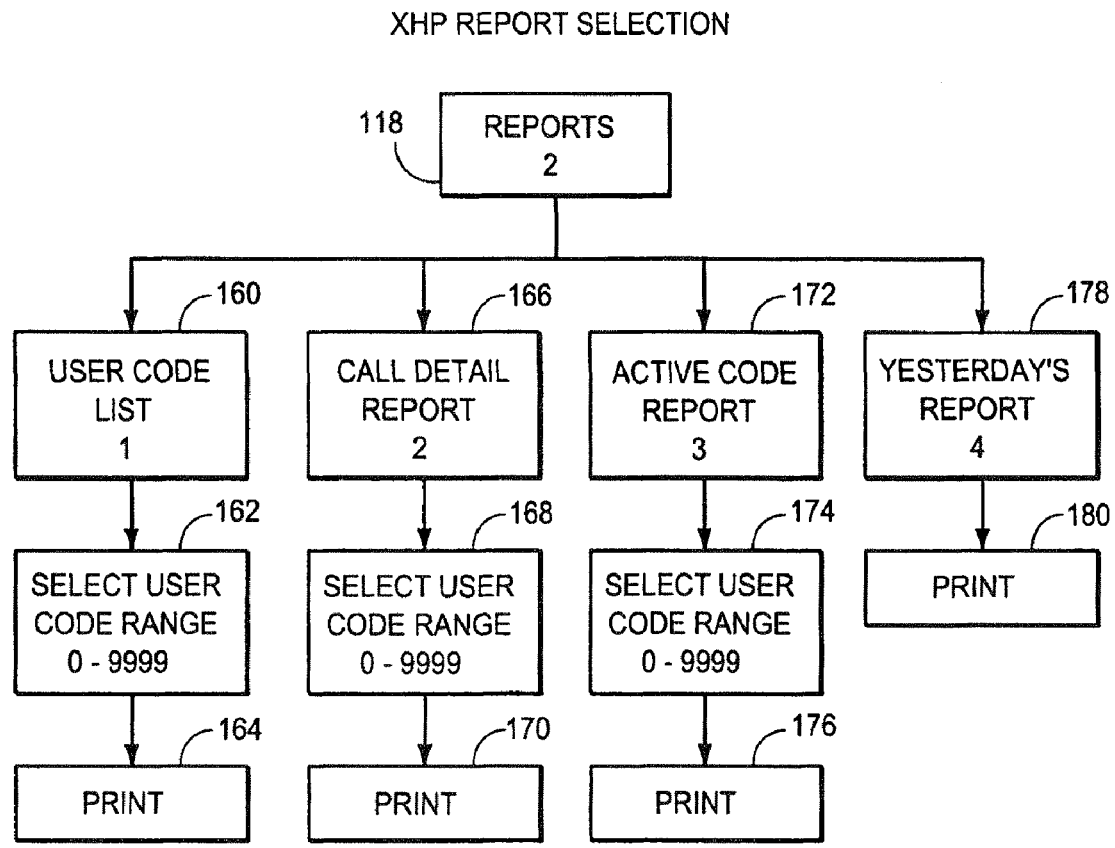
FIG. 5 is a flow chart that depicts the "reports" step of FIG. 3 in more detail.

To obtain one of these reports, the system administrator dials a "2" in response to the initial prompt of FIG. 3, and this results in the administrator's being afforded the choices, that FIG. 5 represents. Pressing the "1" key selects the user-code list, and the administrator is prompted to enter the user-code range for which the list is to be generated. When he has done so, the access-control module generates this report, typically by generating a hard copy by way of a printer. The contents of the report would typically be of a generally historical nature, giving, for instance, the average traffic for each user by day of the week and, for instance, breaking down the calls by type, e.g., internal, same area code, different area code, and different country code. This report might also include various current system parameters. Blocks 160, 162, and 164 represent the process for generating this report.

Dialing "2" gives the administrator a call-detail report, which lists each call in reverse order of occurrence, telling the date, time, destination, and disposition of the call. This report is particularly convenient because large blocks of "failed authorization code" entries in the report's disposition column are easily identifiable symptoms of attempts at unauthorized access. In the illustrated embodiment, the last 5,000 call records are usually retained, and the system administrator can restrict the size of the report by selecting a user-code range. Blocks 166, 168, and 170 represent the generation of such a report.

Whereas the user-code list is generated in order of user code and concentrates on historical data, the active-code list, which also is organized by user code, lists only those for which traffic has occurred since the last time a daily report was generated. This gives the historical data but also gives the data for the current day, including a histogram of activity by hour of the day. Like other reports, the active-code list can be restricted by user-code range. The report would also include flags, typically in the form of asterisks in the margins, to identify those authorization codes for which unusual activity has occurred, "unusual" being activity characterized by the deviations defined above. Blocks 172, 174, and 176 represent generation of such a report.

Even without administrator initiative, a daily active-code report is typically generated every morning and stored in memory, and the administrator can request that such a report be printed out by pressing the "4" key, as blocks 178 and 180 indicate.

Figure 6:
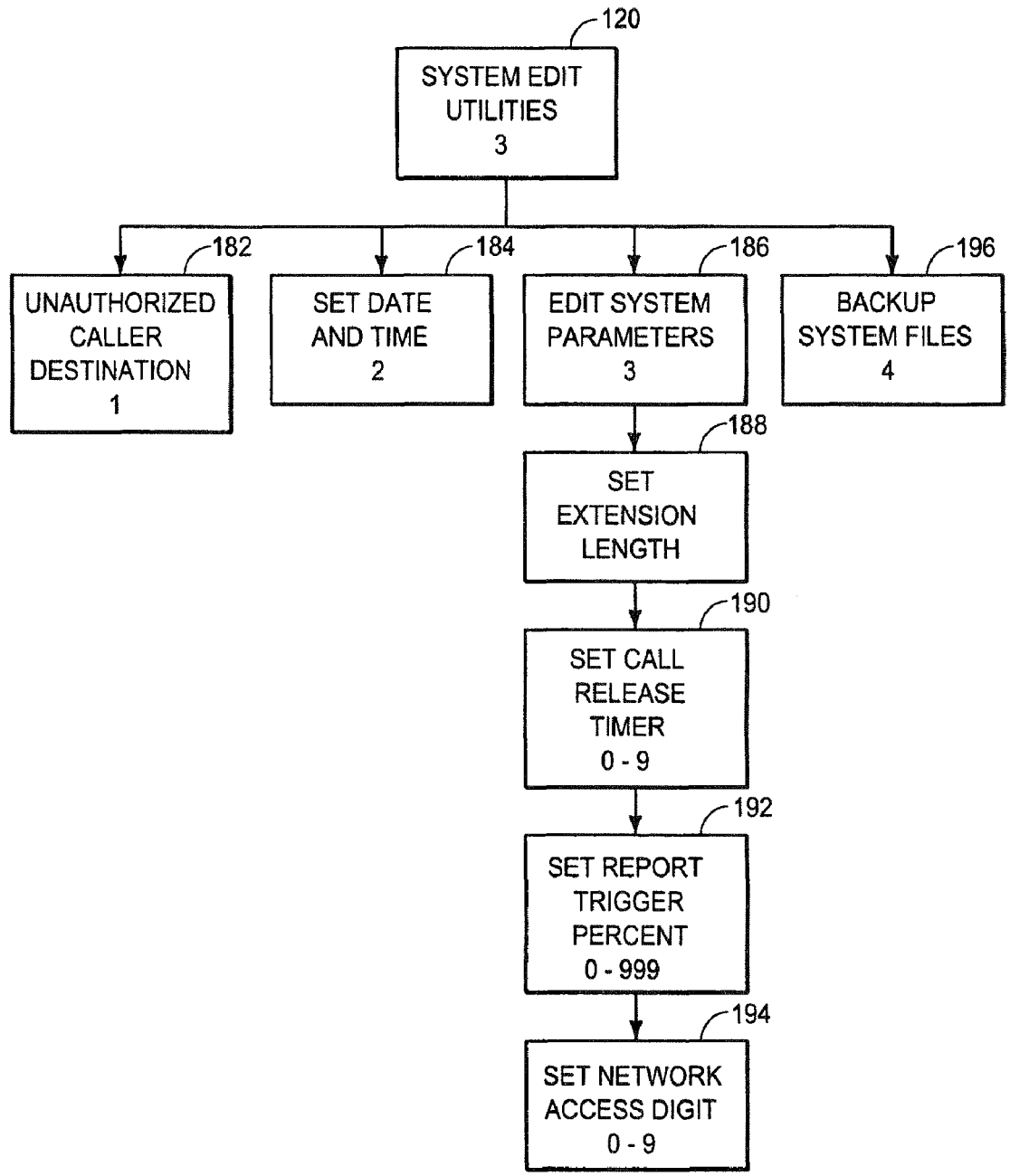
FIG. 6 is a flow chart that depicts the "system edit utilities" step in more detail.

As was indicated above, the administrator can gain access to the system-edit utilities from the main menu of FIG. 3 by pressing the "3" key. This enables the administrator to perform various configurational operations that FIG. 6 depicts. As was indicated in connection with block 76 of FIG. 2A, inability to "complete your call as dialed" ordinarily causes the call to be forwarded to a default destination, and dialing "1" gives the administrator a prompt in response to which he can enter the extension to which such calls are to be directed. Block 182 represents this function.

Similarly, dialing "2" enables the system administrator to enter the current date and time and thus to set the real-time clock on which the system bases its statistics, as block 184 indicates.

Block 186 indicates that dialing a "3" enables the system administrator to set various system parameters. The first prompt that the administrator receives in response to the "3" entry is one that requests the number of digits in the user ID codes, as block 188 indicates. The next prompt, represented by block 190, requests the duration of the pre-release delay imposed in step 100 of FIG. 2B.

With the next prompt, the administrator is invited to set the parameter R used in the calculations above to determine whether users' call patterns have deviated excessively from historical norms. As was just explained, this factor is also used in determining whether to flag various report entries. Block 192 represents setting this parameter.

The last prompt requests that the network-access digit be set. This is typically the "9" digit, and it is used to obtain an outside line. Block 194 represents this action.

The system typically backs up its volatile files by writing them onto, for instance, a floppy disk in response to various predetermined occurrences. The system administrator can request that an additional backup occur by dialing "4" under the system-edit-utilities menu, as block 196 indicates.

When the system administrator presses the "4" key to make menu selection 122 in FIG. 3, he receives a prompt that requests the current global class of service. Pressing the "0," "1," or "2" key sets the corresponding global class of service.

We believe that an access-control module that can be programmed in this manner, i.e., by simply dialing from the administrator's extension, is particularly simple to install and use and lends itself to relatively low-cost manufacture. However, the broader teachings of the present invention are readily embodied in systems that, for instance, are programmable from a conventional, attached keyboard.

Additionally, those skilled in the art will recognize that figures of merit other than that identified as "F" in the above description can be used to indicate whether a sufficient deviation from the historical pattern has occurred. Moreover, the deviations do not have to be calculated on the basis of individual days of the week and can simply be calculated on the basis of days generally or weekend days versus weekdays, for instance.

Furthermore, the broader aspects of the invention do not require a PBX; they can be implemented, for instance, in other communications facilities whose calls ostensibly identify the users who make them. Telephone operating companies, for instance, can use the invention at central offices to restrict access both for their benefit and for that of their customers.

Accordingly, the present invention can be realized in a wide range of embodiments and thus constitutes a significant advance in the art.

What is claimed is:

1. A method, comprising:
    determining a class of service for a device;
    establishing a baseline call pattern for the device;
    monitoring an actual call pattern for the device;
    identifying a deviation between the baseline call pattern and the actual call pattern; and
    establishing a call connection for the device according to the class of service associated with the device in response to the deviation;
    wherein the class of service identifies a level of system access accorded to the device.

2. The method of claim 1, further comprising:
    determining a difference between a requested call and the baseline call pattern;
    wherein establishing the call connection occurs according to the difference.

3. The method of claim 1, wherein the class of service comprises at least one of call access levels associated with call destinations, device service classes, or device global classes.

4. The method of claim 1,
    wherein the device comprises a first class of service; and
    wherein establishing the call connection further comprises establishing a first type of call connection in response to the first class of service and the deviation exceeding a first threshold.

5. The method of claim 4,
    wherein the device comprises a second class of service; and
    wherein establishing the call connection further comprises establishing a second type of call connection in response to the second class of service and the deviation exceeding a second threshold.

6. The method of claim 5,
    wherein the device comprises a third class of service; and
    wherein establishing the call connection further comprises:
        restricting access to outbound trunks in response to the third class of service and the deviation exceeding a third threshold; and
        alerting an administrator of having restricted the access to the outbound trunks.

7. The method of claim 1, further comprising:
    establishing the baseline call pattern for the device over a baseline time period; and
    monitoring the actual call pattern for the device over a monitoring time period.

8. An apparatus, comprising:
    means for determining a class of service for a device;
    means for establishing a baseline call pattern for the device;
    means for monitoring an actual call pattern for the device;
    means for identifying a deviation between the baseline call pattern and the actual call pattern; and
    means for establishing a call connection for the device according to the determined class of service for the device in response to the deviation;
    wherein the class of service identifies a level of system access accorded to the device.

9. The apparatus of claim 8, further comprising:
    means for determining a difference between a requested call and the baseline call pattern;
    wherein the means for establishing the call connection operates in response to the difference.

10. The apparatus of claim 8, wherein the class of service for the device comprises at least one of call access levels associated with call destinations, device service classes, or device global classes.

11. The apparatus of claim 8, further comprising means for establishing a first type of call connection in response to the deviation exceeding a first threshold and the device comprising a first class of service.

12. The apparatus of claim 11, further comprising means for establishing a second type of call connection in response to the deviation exceeding a second threshold and the device comprising a second class of service.

13. The apparatus of claim 12, further comprising:
    means for restricting access to outbound trunks in response to the deviation exceeding a third threshold and the device comprising a third class of service; and
    means for alerting an administrator of having restricted the access to the outbound trunks.

14. The apparatus of claim 8, further comprising:
    means for establishing the baseline call pattern for the device over a baseline time period; and
    means for monitoring the actual call pattern for the device over a monitoring time period.

15. An apparatus, comprising:
    a processing device configured to:
        determine a class of service for a device;
        establish a baseline call pattern for the device;
        monitor an actual call pattern for the device;
        identify a deviation between the baseline call pattern and the actual call pattern; and establish a call connection for the device according to the determined class of service for the device in response to the deviation;

wherein the class of service indicates a level of system access.

16. The apparatus of claim 15, wherein the processing device is further configured to:

determine a difference between a requested call and the baseline call pattern; and establish the call connection according to the difference.

17. The apparatus of claim 15, wherein the class of service for the device comprises at least one of call access levels associated with call destinations, device service classes, or device global classes.

18. The apparatus of claim 15, wherein the processing device is further configured to establish a first type of call connection in response to the deviation exceeding a first threshold and the device comprising a first class of service.

19. The apparatus of claim 18, wherein the processing device is further configured to establish a second type of call connection in response to the deviation exceeding a second threshold and the device comprising a second class of service.

20. The apparatus of claim 19, wherein the processing device is further configured to:

restrict access to outbound trunks in response to the deviation exceeding a third threshold and the device comprising a third class of service; and alert an administrator of having restricted the access to the outbound trunks.

21. The apparatus of claim 15, wherein the processing device is further configured to:

establish the baseline call pattern for the device over a baseline time period; and monitor the actual call pattern for the device over a monitoring time period.

* * * * *